United States Patent

[11] 3,577,889

[72] Inventor Herluf N. Eriksen
 Burlington, N.J.
[21] Appl. No. 834,262
[22] Filed June 18, 1969
[45] Patented May 11, 1971
[73] Assignee Keene Corporation
 Trenton, N.J.

[54] METHOD AND APPARATUS FOR SLITTING AND TRIMMING PIPE COVERING
 9 Claims, 19 Drawing Figs.
[52] U.S. Cl. ................................................. 83/7,
 29/235, 29/450, 29/453, 83/8, 83/9, 83/54, 83/201.01
[51] Int. Cl. ..................................................... B26d 3/08,
 B23d 21/04
[50] Field of Search ........................................... 83/7, 8, 9,
 54, 10, 201.01, 45; 29/450, 453, 234, 235

[56] References Cited
 UNITED STATES PATENTS
 2,756,172 7/1956 Kidd ........................... 29/453UX
 3,499,210 3/1970 Schellstede et al. .......... 29/453X Primary Examiner—James M. Meister
Attorney—James R. Campbell

ABSTRACT: An apparatus for finishing tubular members, conveyor means for moving tubular members in spaced-apart relation along a predetermined path, and along said path a first cutting station including a first saw blade for cutting one wall of the tubular member for its entire length, a second cutting station including a second cutting blade for partially slitting the inner wall of said tubular member along a line diametrically opposed to said first cut to provide a hinge, and a trimming station including a pair of spaced cutting elements to trim opposite axial ends of the tubular members upon relative movement of the tubular member and cutting elements.

Patented May 11, 1971

INVENTOR:
HERLUF N. ERIKSEN
BY Howson & Howson
ATTYS.

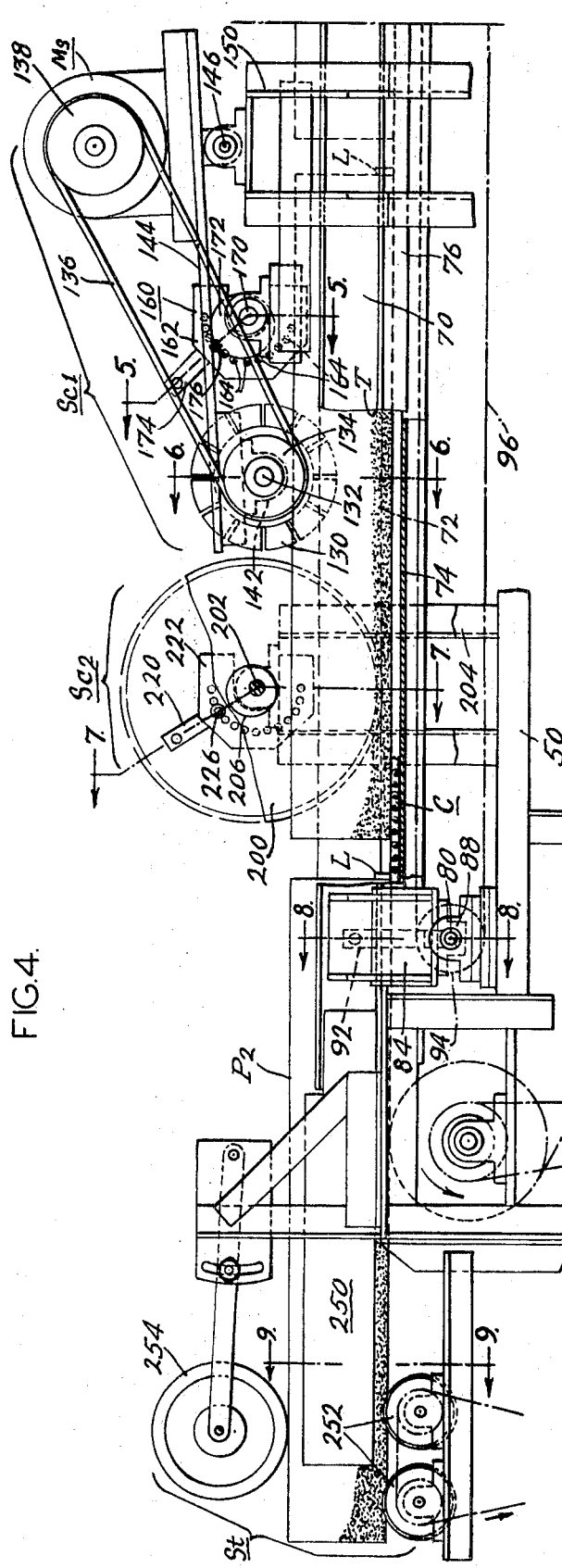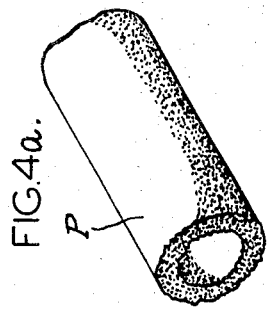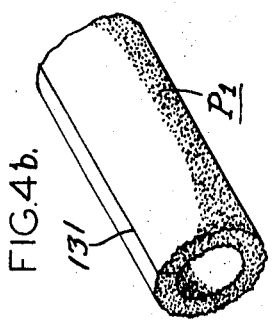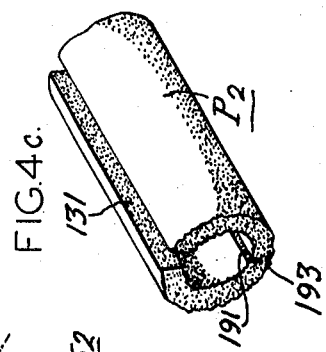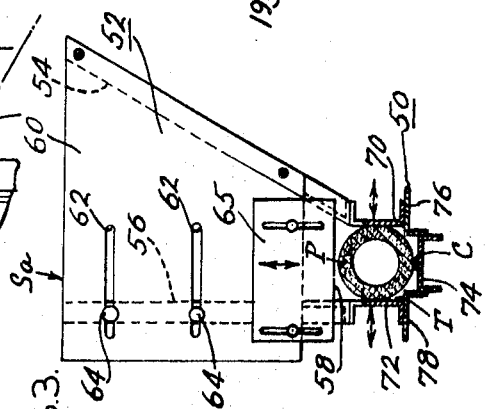

Patented May 11, 1971
3,577,889
5 Sheets-Sheet 3
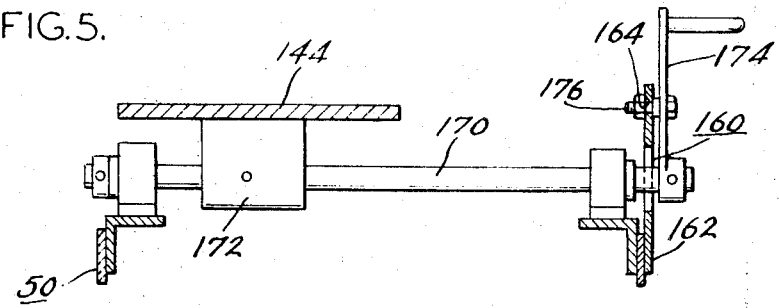
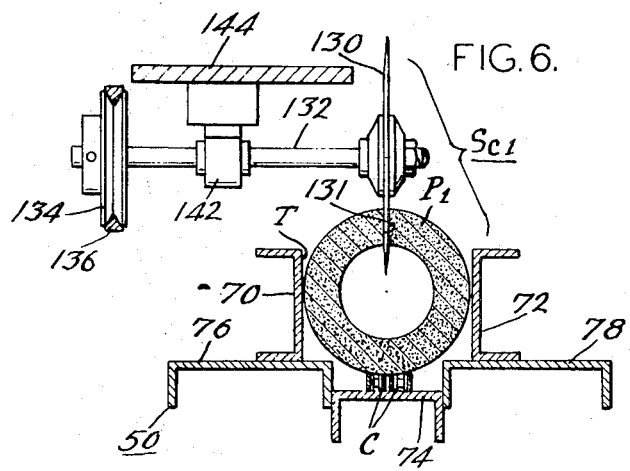
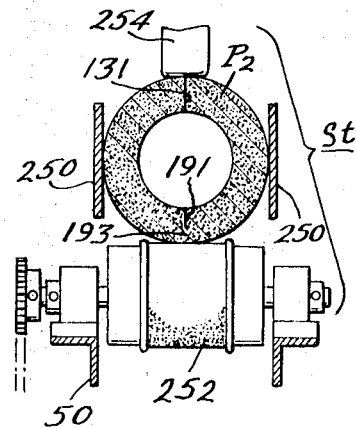
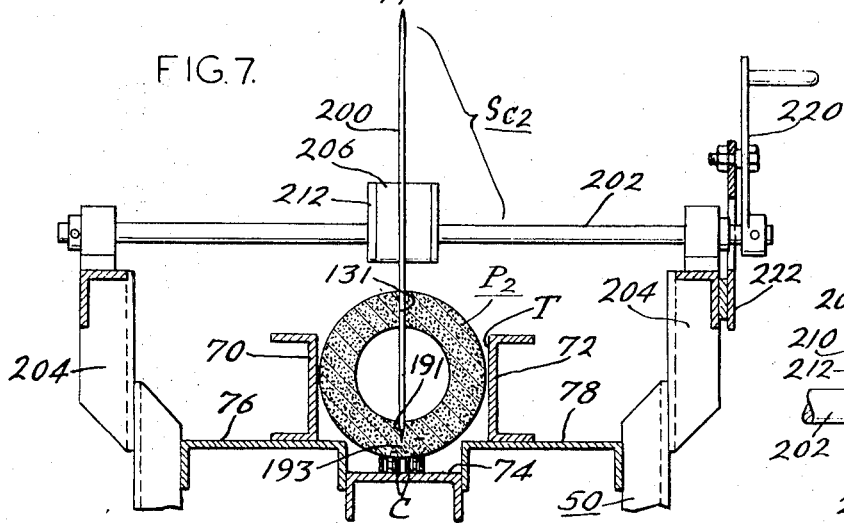
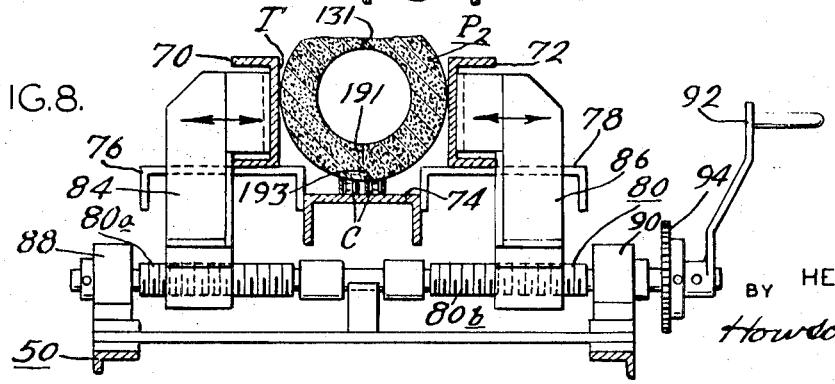
INVENTOR:
HERLUF N. ERIKSEN
BY Howson & Howson
ATTYS.

Patented May 11, 1971
3,577,889
5 Sheets-Sheet 4
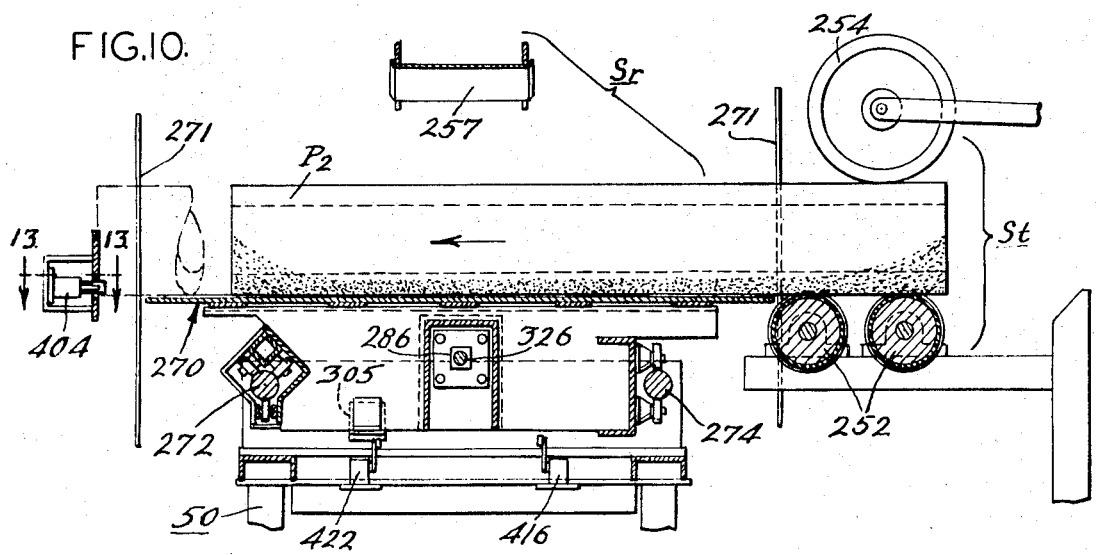
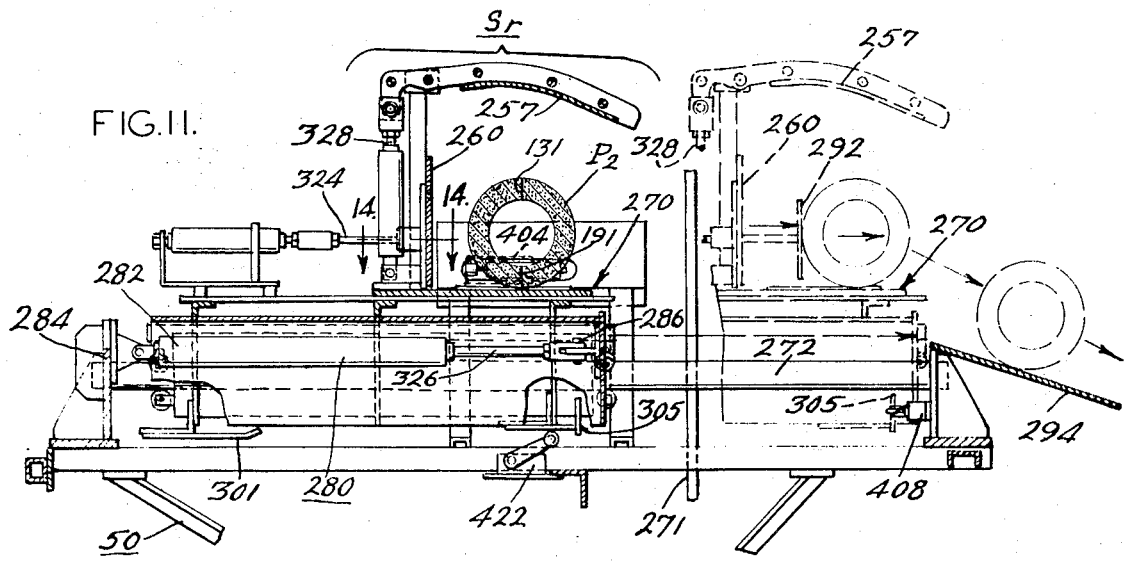
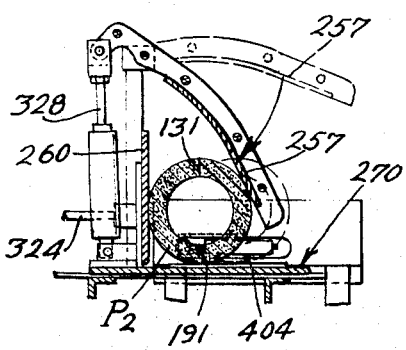
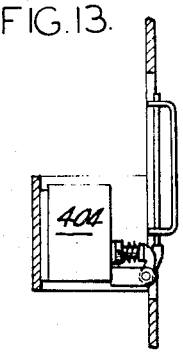
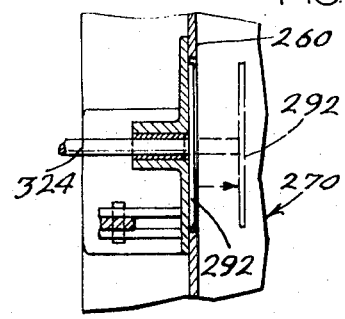
INVENTOR:
HERLUF N. ERIKSEN
BY Howson & Howson
ATTYS.

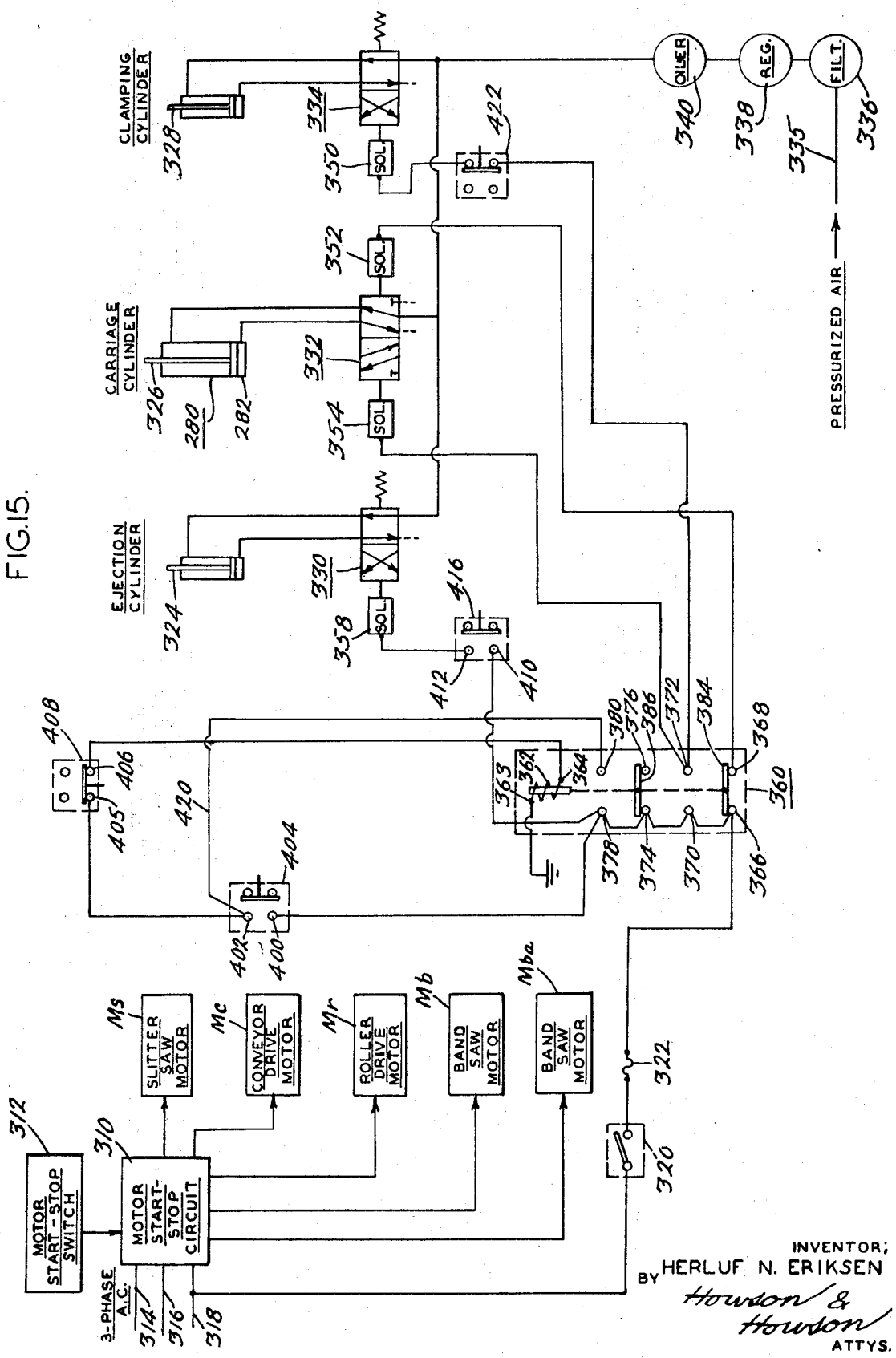

METHOD AND APPARATUS FOR SLITTING AND TRIMMING PIPE COVERING

The present invention relates to method and apparatus for finishing tubular members and more specifically to a new and improved method for slitting and trimming pipe cover used for insulating pipe.

Pipe cover of the type to which the present invention relates generally comprises a plurality of layers of an insulating material such as mineral wool which are formed as an integral assembly by use of a binder. This type of covering is generally made by wrapping a layer of mineral wool impregnated with a binder on a mandrel and after a predetermined number of wraps, depending on the desired cross section of the pipe cover, the assembly is cured and then discharged from the mandrel.

The present invention provides a new and improved method and apparatus for handling partially finished pipe cover and more specifically to a method and apparatus for automating the procedure for trimming the ends of the cover and forming the cut and partial slit to define the hinge. To this end, the apparatus includes an accumulator station wherein the partially finished pipe covers are deposited after discharge from the mandrel of the pipe forming apparatus. The partially finished pipe covers are discharged one at a time from the accumulator station and moved along a predetermined path by means of a conveyor through a first power-driven slitting saw which cuts one wall the entire length of the cover and simultaneously the inner wall is partially slit by means of a circular slitting blade which is selectively adjustable to control the depth of penetration of the partial slit to provide a hinge of a desired thickness. Thereafter, the cut and slit covers are moved to a trimming station including a pair of spaced-apart endless cutting band saws which trim the opposite terminal ends of the cover. The trimming station includes a reciprocating carriage which moves the pipe cover in relation to the band saws and a clamp for securing the pipe cover in place on the carriage. The carriage also has means for discharging finished pipe cover.

The present invention provides a method and apparatus for completely automating the finishing operation for pipe covers whereby a large number of pipe covers can be processed very rapidly. Further, the apparatus insures uniformity in all of the pipe cover processed. Moreover, in accordance with the present invention the depth of the partial slit forming the hinge may be controlled very accurately, and this is of particular importance in thin-walled pipe cover. The complete automating of the finishing operation also minimizes handling and thus minimizes the chance of damaging the pipe cover resulting from handling.

These and other objects of the present invention and the various details of the operation and construction of a pipe cover trimming and slitting apparatus in accordance with the present invention are hereinafter more fully set forth with reference to the accompanying drawings, wherein;

FIG. 3 is a view of the accumulator station taken along lines 3-3 of FIG. 2;

FIG. 4 is an enlarged side elevational view partly in section of the cutting and slitting portion of the apparatus;

FIGS. 4a and 4b are fragmentary perspective views of the pipe cover at various stages of finish, and FIG. 4c is a fragmentary perspective view after cutting and slitting;

Figures 1, 2:
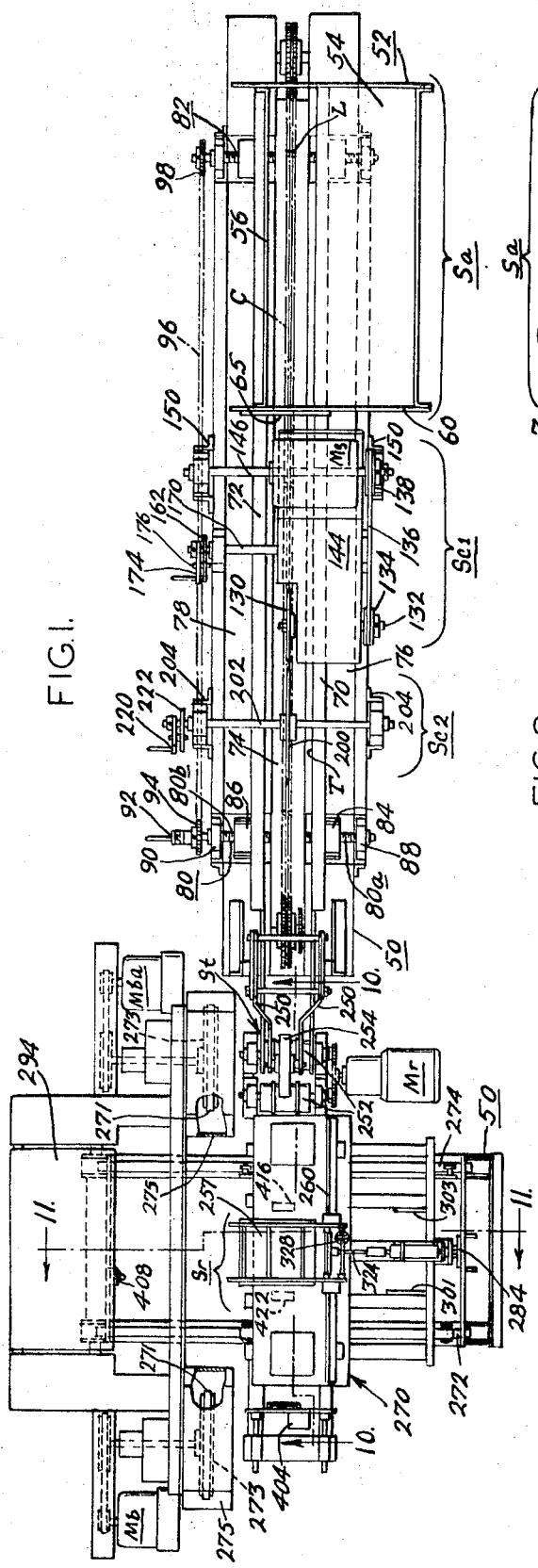
FIG. 1 is a plan view of a pipe cover cutting and trimming apparatus in accordance with the present invention.
FIG. 2 is a side elevational view of the apparatus shown in FIG. 1.

FIGS. 5, 6 and 7 are enlarged sectional views taken on lines 5-5, 6-6 and 7-7 respectively of FIG. 4;

FIG. 7a is a sectional view showing the mounting hub for the partial slitting blade;

FIG. 8 is an enlarged sectional view taken on lines 8-8 of FIG. 4 showing the discharge section of the cutting and slitting portion of the machine and the adjustable guide members;

FIG. 9 is a sectional view taken on lines 9-9 of FIG. 4 showing the terminal end of the discharge section including the guide rollers and side guide elements;

FIGS. 10 and 11 are sectional views taken on lines 10-10 and 11-11 of FIG. 1;

FIG. 12 is a fragmentary view showing the pipe cover clamping mechanism in a down position and in a retracted position;

FIG. 13 is an enlarged view taken on lines 13-13 of the limit actuator switch for initiating the trimming cycle;

FIG. 14 is an enlarged sectional view taken on lines 14-14 of FIG. 11 showing the pipe cover discharge ram in a retracted position and in an extended position; and FIG. 15 is a schematic of the electrical and pneumatic circuit for controlling the sequence of operation of the apparatus.

Considering now the apparatus in terms of function and referring particularly to the basic elements and details of operation of the machine, untrimmed and uncut tubular members, in the present instance partially finished pipe cover P (see FIG. 4a) are deposited at an accumulator station $S_a$ which as illustrated in FIG. 3 is in the form of a bin having a downwardly convergent configuration so that only one pipe cover at a time discharges from the elongated discharge slot at the bottom end thereof. The pipe cover P so discharged is moved along a predetermined straight line path in a trackway T by means of an endless conveyor C having a plurality of spaced-apart lugs L mounted thereon to engage the ends of each pipe cover. The conveyor C is actuated by means of motor $M_c$ and a conventional transmission system. Along the path of movement of the pipe cover P there is provided a first cutting station $S_{c1}$ including cutting means for slitting one wall the entire length of the pipe cover so that it is in the form illustrated in 4b designated $P_1$. A second cutting station $S_{c2}$ along said path is provided to form a partial slit in the interior wall of the pipe cover diametrically opposed from the longitudinal cut to define a longitudinal hinge. After passage through this station, it is in the form illustrated in FIG. 4c designated $P_2$. The pipe cover in this form then continues to the terminal end of the path to a trimming station $S_t$ which includes a carriage for receiving the pipe cover in the form illustrated in FIG. 4c and a pair of spaced-apart endless band saws. A clamping member secures the pipe cover on the carriage and thereafter the carriage is actuated in a direction transverse to the straight line path whereby the ends are trimmed and the finished pipe cover then is discharged to a collecting hopper or the like (not shown).

Considering now the specific structural arrangement and details of the apparatus, the apparatus includes a main frame structure 50, portions of which are not shown in the drawings for simplicity and so that the essential elements may be seen more clearly and a hopper 52 defining the accumulator station mounted on the frame structure. The hopper as best illustrated in FIG. 3 is of troughlike configuration having a diverging or slanted sidewall 54 which is spaced from the upright opposite sidewall 56 at its lower edge to define an elongated discharge slot 58 of a width to discharge one pipe cover at a time therethrough. The widthwise dimension of discharge slot 58 may be varied so that the apparatus may accommodate pipe covers of different diameters and to this end the end walls 60 which are securely fastened to the sidewall 54 at opposite end edges are provided with slotted openings 62 within which are received conventional screw fasteners 64 to secure the end walls to the opposed sidewall 56 in a predetermined preset position. Additionally, an adjustable plate 65 is mounted at the front end of the discharge slot 58 so that only one pipe cover at a time may be discharged from the accumulator station by the conveyor C.

The pipe cover P after it is discharged from the accumulator station by a lug on the conveyor C is moved in a straight line path along the trackway T which is defined by a pair of elongated spaced-apart channel-shaped guide members 70 and 72 forming sidewalls of the trackway T and an elongated base member 74 against which the chain conveyor engages during its upper run. The sidewall members 70 and 72 are supported for sideways adjustment to thereby vary the width of the trackway T on support members 76 and 78 forming part of the main frame.

The sidewall members are adjustable sideways in equal increments from the centerline of the trackway T by means of a pair of identical spaced-apart adjusting screws 80 and 82. For example, the adjusting screw 80 has right- and left-hand screw segments 80a and 80b engageable in threaded projections of brackets 84 and 86 secured to the opposed sideplate members 70 and 72 defining the trackway T. The opposite terminal ends of the screw members are rotatably received in journals 88 and 90 supported on the main frame. The screw members 80 and 82 are adapted for simultaneous actuation through a hand crank 92 which rotates a sprocket 94 connected to one of the screw adjustment members, the sprocket 94 in turn being connected through a chain 96 to the sprocket 98 carried by the forward adjusting screw 82. It is clear that by this arrangement the hand crank may be rotated in one direction whereby both the feed screws 80 and 82 move the sidewalls inwardly to narrow the width of the trackway T for a given size pipe cover. Of course, actuation of the hand crank 92 in the opposite direction affects rotation of the screws in the opposite direction to enlarge the widthwise dimension of the trackway T.

In the course of movement in the trackway T, the pipe cover P enters the first cutting station $S_{c1}$ wherein a rotatably mounted circular saw blade 130 engages the upper wall of the pipe cover to form a cut 131 therein along a line passing through the central axis of the pipe cover. In the present instance, circular saw 130 is mounted on one end of a shaft 132 which at its opposite end mounts a pulley 134 in turn driven by means of a belt 136 connected to the drive pulley 138 of the actuating motor $M_s$. The shaft 132 engages in a collar 142 depending from a platform 144 pivotally supported as at 146 on an upstanding bracket 150 secured to the main frame. The platform 144 also mounts the motor $M_s$ as best illustrated in FIGS. 4, 5 and 6.

The mounting assembly for the circular saw 130 may be pivoted about the axis 146 by an adjusting arrangement broadly designated by the numeral 160 so that the depth of penetration of the saw 130 may be selectively controlled and varied depending on the diameter of the pipe cover being processed. In the present instance, this adjusting arrangement 160 includes a fixed shield 162 having a plurality of openings 164 arranged in a semicircular array, a shaft member 170 which mounts an eccentric cam element 172 engaging the platform 144 at a point between the axis of the saw 130 and the pivot point 146 and an adjustment handle 174 for controlling rotation of the shaft 170. The handle may be secured in a predetermined fixed position by means of a pin 176 engageable in one of the openings 164 in the plate 162 for a selected position. It is clear that by this arrangement the assembly may be raised or lowered simply by releasing the pin 176 whereby the crank 174 may be rotated which through the eccentric cam 172 pivots the platform to a higher or lower position from that shown in FIG. 4.

The pipe cover in the form shown in FIG. 4b is moved by the conveyor to the second cutting station $S_{c2}$ wherein a partial slit 191 extending the length of the pipe cover is provided in the interior wall thereof diametrically opposed from the cut 131 put in the cover at the first cutting station to provide a hinge 193 whereby the halves of the pipe cover may be spread apart or pivoted about the hinge for assembly purpose. As best illustrated in FIGS. 4 and 7, the partial slit is formed by a circular saw blade 200 of larger diameter than the blade 130 mounted on a shaft 202 supported at opposite ends in journals mounted on upstanding support brackets 204 projecting from the main frame. As best illustrated in FIG. 7a, the rotary blade 200 is mounted on a collar 206 by suitable screw fasteners 208 which collar is supported for rotation on bearings 210 relative to a hub member 212 keyed to the shaft 202. By this arrangement, in the normal operation, the rotary blade 200 and collar 206 rotate relative to the hub 212. Further, the rotary blade 200 is rotated by engagement with the pipe cover upon passage through the station.

The depth of penetration of the cutting edge of the blade 200 may be selectively varied and to this end the hub 212 is eccentrically mounted on the shaft 202 and an adjustment means is provided for selectively raising or lowering the center of rotation of the knife. The adjustment means comprises an adjusting handle 220 secured to one end of the shaft 202 and a plate 222 having a plurality of openings arranged in an arcuate array therein to receive a locating pin 226 engaging through the handle and a selected one of the openings in the plate 222. This arrangement permits the center of rotation of the blade 200 to be raised or lowered selectively.

After the conveyor moves the pipe cover through the second cutting station, the cut and slit pipe cover passes through a transition station $S_t$ which, as illustrated, includes a pair of spaced-apart side guide members 250 and power rollers 252 driven by motor $M_r$ through conventional transmission below the trackway and a guide roller 254 pivotally mounted on a support bracket connected to the main frame disposed above the trackway.

From the transition station the pipe cover $P_2$ moves into the trimming station $S_r$ where a pivotally mounted clamp arm 257 is lowered to a position securely holding the pipe cover against the backplate 260 of a movable carriage assembly broadly designated by the numeral 270. The carriage assembly 270 is mounted for reciprocating movement in a direction transverse to the trackway T or initial path of movement of the pipe cover from a retracted position shown in solid lines in FIG. 11 to a forward position shown in broken lines in FIG. 11 and during the course of travel between these positions, the pipe cover is moved past the bandsaw assemblies whereby the outer terminal ends are trimmed to provide finished axial ends.

As best illustrated in FIG. 2, each band saw assembly includes a housing 275, an endless saw blade 271 mounted for movement in an endless path between pulleys 273. The saw blades are suitably actuated by means of a band saw motor $M_s$ connected by conventional transmission means to the drive pulley. In the present instance, the assemblies are fixedly mounted; however, they may be mounted for movement relative to one another if it is desired to change or vary the finished length of pipe cover.

The mounting arrangement for facilitating movement of the carriage includes a pair of fixed guide rods 272 and 274 mounted on the main frame which are straddled and engaged by rollers carried on runners forming an integral part of the carriage assembly. Movement of the carriage between retracted and extended positions is controlled by hydraulic actuator 280, the cylinder 282 of which is secured to a bracket 284 mounted on the main frame and the outer terminal end of the piston is connected to the forward end of the carriage as at 286. The piston cylinder actuator 280 is initiated to move the carriage to a forward position by engagement of a switch upon entry of a pipe cover into the trimming station as explained in more detail later. As the carriage nears the forward limit position, the forward end thereof engages a switch control initiating operation of a pusher or ram 292 to discharge the finished pipe cover down a ramp 294 to a suitable collecting hopper or bin. When the carriage assembly has reached its full forward position, a bumper 303 mounted on the rear portion thereof engages a pivotally mounted switch arm of a switch actuator which reverses flow in the hydraulic actuator 280 to reverse the carriage and return it to its retracted position to receive another pipe cover from the transition station.

FIG. 15 illustrates schematically the electrical and pneumatic circuit used to control the sequence of operations in the embodiment of the invention illustrated in the preceding FIGS.

As illustrated, the slitter saw motor $M_s$, the conveyor drive motor $M_c$, the roller drive motor $M_r$, the band saw motors $M_b$ and $M_{ba}$ are all supplied with suitable operating power, typically 220 volts, 60-cycle, three-phase voltage from a power line source by way of motor start-stop circuit 310. The latter circuit may be entirely conventional, and is controlled in the usual manner by a motor stop-start switch 312 connected thereto. All of the motors may thus be turned on at the same time and operated continuously.

The three-phase supply voltage for the motor start-stop circuit 310 is supplied over power lines 314, 316 and 318, and the voltage on the line 318 is also supplied by way of a single-pole switch 320 and a protective fuse 322 to the electrical circuit which controls timing of the operations of the ejection piston 324, the carriage control piston 326 and the clamping piston 328 by means of the solenoid-operated pneumatic valves 330, 332 and 334 respectively, each of which may be conventional in form. The valves are supplied with pressurized air from any convenient pneumatic line 335 by way of an air filter 336, a regulator 338 and an oiler 340, all conventional. Clamping control valve 334 includes the usual solenoid 350, and the valve construction is such that when current is passed through coil 350 the clamping piston 328 is driven outwardly to lower clamping arm 257, while in the absence of current through coil 350 the piston 328 is driven inwardly to raise the clamping arm. The carriage control valve 332 is provided with a pair of solenoids 352 and 354, current through solenoid 352 serving to operate carriage 270 to its retracted position and current through coil 354 serving to advance carriage 270 to accomplish cropping of the ends of the pipe cover. Valve 330 includes a solenoid 358 which responds to current through it to move ejection piston 324 outwardly to accomplish ejection of the roll, while absence of current through control valve 358 causes piston 324 to return to its normal withdrawn position.

The electrical circuitry for controlling operation of the valves includes a conventional eight-contact relay switch 360 comprising a control coil 362 having two terminals 363 and 364, a first pair of contacts 366 and 368, a second pair of contacts 370 and 372, a third pair of contacts 374 and 376 and a fourth pair of contacts 378 and 380. A pair of ganged switch arms 384 and 386 normally connect terminal 366 to terminal 368 and terminal 374 to terminal 376, but, in response to current through the control coil 362, disconnect the latter contacts and instead connect contact 370 to contact 372 and contact 378 to contact 380. Contacts 366, 370, 374 and 378 are all permanently interconnected; contacts 374 and 376 are not used for switching purposes in this example.

Switch contact 378 is connected to the normally-open contacts 400 and 402 of microswitch 404, so that when the latter microswitch is operated a circuit is completed between contact 378 and control coil terminal 364 by way of the normally-closed contacts 405 and 406 of microswitch 408. Relay switch contact 378 is also connected to the normally-open contacts 410 and 412 of microswitch 416 and thence to solenoid 358, so that upon operation of microswitch 416 voltage is supplied to solenoid 358. Contact 402 of microswitch 404 is also connected to relay switch contact 380 by way of line 420 to provide a relay latching function to be described hereinafter. Relay contact 368 is connected to solenoid 352, while relay contact 372 is connected to solenoid 354. The latter contact 372 is also connected by way of normally-closed microswitch 422 to solenoid 350 of valve 334.

In the operation of the circuitry shown in FIG. 15, with manual switch 320 open the positions of the switches and pistons are as shown in the drawing. When manual switch 320 is closed, initially the only path for current is through relay switch arm 384 to solenoid 352 of carriage control valve 332, current through solenoid 352 serving to hold the carriage in its retracted position. All other current paths are blocked by open contacts of the microswitches. However, when a pipe cover then is delivered into a position to close normally-open microswitch 404, current is applied from contact 378, by way of microswitches 404 and 408, through control coil 362 to ground, thereby causing switch arms 384 and 386 to move to their upward positions. When the latter switch arms have been so actuated, contact 378 is connected to contact 380 and current thereby supplied over latching line 420 and through microswitch 408 to control coil 362 to hold the relay switch in its actuated condition even after microswitch 404 reopens.

The above-described actuation of relay switch 360 connects together contacts 370 and 372 thereof, thereby supplying current by way of microswitch 422 to clamping control solenoid 350 and thence to ground, thereby operating clamping piston 328 to its outward position; this causes clamping arm 257 to descend into its clamping position against the pipe cover to hold it in place. The above-mentioned interconnection of contacts 370 and 372 simultaneously applies current to solenoid 354 and thence to ground, while discontinuing the current to solenoid 352, so that carriage control piston 326 is advanced to move the carriage and the pipe cover thereon into position for the end trimming operation described previously.

When the carriage and the pipe cover thereon have advanced sufficiently to complete the end trimming operation, continued forward motion of the carriage causes cam 301 to operate microswitch 422 to its open condition, thereby cutting off current flow to solenoid 250 and causing clamping arm 257 to be raised from its clamping position. Immediately after this operation, further advance of carriage 270 causes microswitch 416 to be operated by cam 303, thereby supplying current to solenoid 358 of ejection valve 330 to advance ejection piston 324 and eject the pipe cover from the carriage. Microswitches 422 and 416 remain actuated as the carriage advances further to the position in which microswitch 408 is operated by bumper 305. Operation of the latter microswitch produces an open circuit to discontinue the flow of current through relay switch control coil 362, thereby to deenergize the relay switch and to cause the switch arms 384 and 386 thereof to return to their original positions. This causes current to be supplied again to solenoid 352 of the carriage control valve 332, rather than to solenoid 354 thereby reversing the direction of motion of the carriage and causing it to return to its original withdrawn position. As the carriage returns, microswitches 422 and 416 are deactuated, and the entire system returns to its original condition, ready to receive and operate upon the next pipe cover.

Recapping now the complete cycle of operation of the pipe cover finishing apparatus described above, assume that the accumulator bin has unfinished pipe cover therein. As noted above, the operation is started by actuating the motor start-stop switch 312 which supplies operating power through the circuit 310 to the various actuators such as the conveyor drive motor $M_c$, the roller drive motor $M_r$, the band saw motors $M_b$ and $M_{b1}$ and the slitter saw motor $M_s$. This switch also conditions through the circuit 310 the various solenoid-operated valves for the clamping cylinder, the ejection cylinder and the carriage actuator cylinders for operation in a predetermined timed sequence.

With the conveyor operating, the first pipe cover in the lower portion of the accumulator bin is moved along the trackway T by means of the lugs L on the conveyor to the first cutting station $S_s$ wherein the slitting saw provides a cut through the wall of the pipe cover for the entire length. The second slitter saw partially cuts the inner wall of the pipe cover at a point diametrically opposed from the complete cut to provide the hinge.

The rollers 252 then deliver the pipe cover from the conveyor through the transition station $S_t$ and move it into the trimming station $S_r$ to a position where the outer terminal end of the pipe cover engages the microswitch 404 thereby supplying current to clamping control solenoid 350 to operate clamping piston 328 to move clamp arm 257 to its lower position to hold the pipe cover on the carriage. Simultaneously, current is supplied to solenoid 354 to advance carriage control piston 326 and initiate cycling of the carriage to its forward limit position.

During movement of the carriage toward its forward limit position, the pipe cover carried by the carriage travels past the inner run of the blades 271 of the band saw assemblies to complete the end trimming operation. Adjacent the end of the forward stroke of the carriage cycle, cam 301 operates microswitch 422 to cutoff flow to solenoid 350 whereby clamping control piston 328 raises clamping arm 257 to its upper position permitting discharge of the finished pipe cover. Immediately thereafter upon further advance of the carriage, cam 303 engages microswitch 416 supplying current to solenoid 358 to advance ejection piston 324 whereby the ram 292 discharges the pipe cover to the ramp 294. At the terminal end of the forward stroke of the carriage, bumper 305 engages microswitch 408 which again supplies current to solenoid 352 of carriage control valve 332 thereby causing it to return to its original retracted position. Return of the carriage deactivates microswitches 416 and 422 thereby readying the system for the next pipe cover arriving at the trimming station. It is noted that the various hydraulic actuators are of conventional design including a piston rod mounted for actuation in a cylinder connected at opposite ends by lines to source of pressurized fluid.

It is noted that the feed cycle of pipe cover during the delivery cycle in the trackway T from the accumulator station to the trimming station and the complete carriage cycle are normally such that the carriage is always in a retracted position to receive the next successive pipe cover when it si ready for entry into the trimming station. This relative arrangement can be effected either through variations in the delivery system or in the carriage cycle. For example, for a predetermined time of the carriage cycle, the linear speed of the upper run of the feed conveyor for a given spacing between the lugs may be selectively regulated by controlling the motor speed in a conventional manner so that the carriage is in a retracted position when a pipe cover is ready to enter the trimming station. Thus, the apparatus described functions in its normal manner to prevent jamming of pipe covers and a smooth continuous sequence of operation.

In the event of malfunction in the system, antijam arrangement can be provided to shut down the conveyor motor in the event, for example, that the normal carriage cycle is interrupted. More specifically suitable means, for example, microswitches or photoelectric sensors may be provided to insure that the carriage is always empty on its return stroke and that the clamping arm is in a raised position or that the carriage cycle is not delayed beyond a predetermined time. If the above conditions have not been met, the microswitches or photoelectric sensors would signal the conveyor motor to stop delivery of the next successive pipe cover in line and thereby preclude jamming of the machine.

While a particular embodiment of a particular invention has been illustrated and described herein, it is not intended to limit the invention and changes and modifications may be made therein within the scope of the following claims.

I claim:

1. In apparatus for finishing tubular members, conveyor means for moving tubular members in spaced-apart relation along a predetermined path, and along said path a first cutting station including a first saw blade for cutting one wall of the tubular member for its entire length, a second cutting station including a second cutting blade for partially slitting the inner wall of said tubular member along a line diametrically opposed to said first cut to provide a hinge, and a trimming station including a pair of spaced cutting elements to trim opposite axial ends of the tubular members upon relative movement of the tubular member and cutting elements.

2. In apparatus as claimed in claim 1 including a reciprocating carriage at said trimming station adapted for movement between a first limit position to receive tubular members from said second cutting station and a second discharge limit position and wherein said cutting elements are endless band saws mounted in a stationary position disposed so that upon actuation of said carriage from said first to said second limit position, the opposite axial ends of said tubular member carried by said carriage are trimmed.

3. In apparatus as claimed in claim 2 including a clamp assembly mounted on said carriage having a pivotally mounted clamping arm actuatable between a lowered position for securing the tubular member in place on said carriage during said trimming operation and a raised position to permit discharge of said tubular member after the trimming operation.

4. In apparatus as claimed in claim 3 including a discharge ram mounted on said carriage for discharging finished tubular members from the carriage as it approaches said second limit position.

5. In apparatus as claimed in claim 1 including an accumulator station at one end of said path defined by a bin having downwardly converging sidewalls to permit discharge of only one tubular member at a time for movement along said path.

6. In apparatus as claimed in claim 5 wherein said path is defined by a trackway having spaced sidewalls which are selectively adjustable widthwise whereby the apparatus may accommodate tubular members of different sizes.

7. In apparatus as claimed in claim 1 wherein said second cutting blade is a disclike cutting blade and means is provided for selectively varying the position of the blade relative to the tubular member so that the depth of cut for said hinge may be controlled.

8. In apparatus as claimed in claim 7 wherein said mounting means for said second cutting blade includes a shaft extending transversely of said path, a hub member keyed to the shaft and a collar carried by the blade rotatably supported on the hub member, said shaft being exposed eccentrically relative to the hub member whereby upon rotation of the shaft the height of the cutting edge of the blade might be varied.

9. A method for finishing tubular members consisting of the steps of moving at least one tubular member along a predetermined path, forming a complete cut along a longitudinal line in one wall of the tubular member for its entire length, forming a partial slit in the inner wall of the tubular member along a line diametrically opposed to the longitudinal cut to provide a hinge and trimming opposite axial ends of the tubular member.